Inventor
Dayton H. Clewell
By Myron J. Burkhard
Attorney

Nov. 11, 1941.  D. H. CLEWELL  2,262,165
GRAVITY METER
Filed July 3, 1940  4 Sheets-Sheet 4
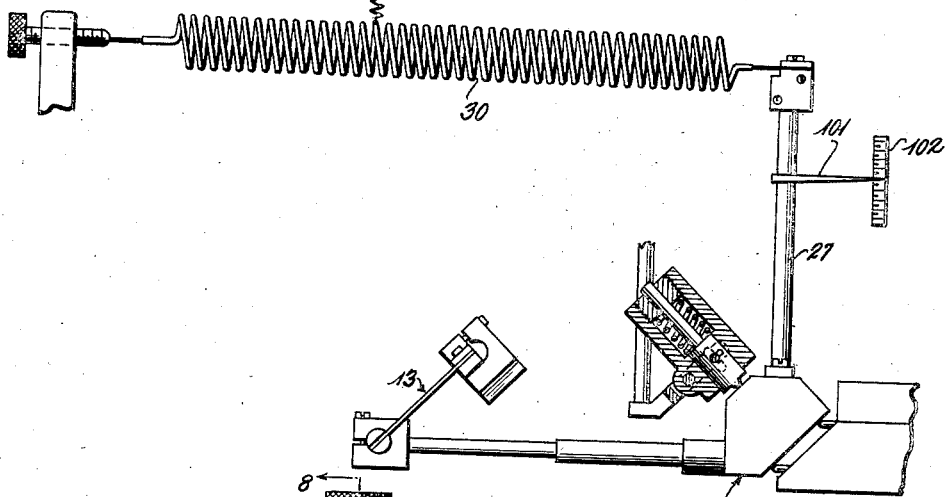
Inventor
Dayton H. Clewell
By Myron J. Burkhard
Attorney Patented Nov. 11, 1941

2,262,165

UNITED STATES PATENT OFFICE 2,262,165

GRAVITY METER

Dayton H. Clewell, Dallas, Tex., assignor, by mesne assignments, to Socony-Vacuum Oil Company, Incorporated, New York, N. Y., a corporation of New York Application July 3, 1940, Serial No. 343,733

5 Claims. (Cl. 265—1.4)

This invention relates generally to geophysical instruments of the type used in locating abnormalities such as discontinuities that are occasioned by faults, anticlines and structures such as salt domes. More particularly, this invention relates to a method and apparatus for measuring directly variations in gravitational force from point to point over the earth's surface.

It has long been known to geologists and others skilled in the art of geophysical prospecting that variations in gravitational force from point to point over the earth's surface are directly related to the disposition of the substrata with respect to the earth's surface; therefore by measuring the variations in gravitational force from point to point over an area of the earth's surface and plotting these data on maps in the form of contours, a map is formed which simulates the contours of the subsurface strata. Such instruments have been found to be quite reliable and they are being used in the industry successfully in conducting the reconnaissance geophysical surveys.

Due to the fact that fractional variations in gravitational force being measured are sometimes no more than $10^{-7}$ a very delicate instrument of extreme accuracy is required. These instruments must be accurate within one part in ten million. The instant invention is directed to such an instrument having extreme flexibility in that means are provided for nulling the instrument by changing the lever arm through which a pretensioned main spring acts upon the pivoted mass without varying the sensitivity of the instrument itself. Additional features included in the design of this instrument reside in the provision of novel means for critically damping the mass; means for rigidly clamping the mass while the instrument is being moved from one location to another; means for varying the position of the anchored end of the pretensioned main spring to effect either a change in the sensitivity of the instrument or to effect a change in the lever arm through which the main spring acts upon the mass; and an optical system by means of which displacements of the mass can be directly observed.

Therefore, the primary object of this invention resides in the provision of a novel method and apparatus whereby the variations in gravitational force from point to point throughout an area on the earth's surface can be measured by a null system.

An additional object of this invention resides in the provision of means whereby the sensitivity of the instrument as well as the effective lever arm through which the main pretensioned spring acts can be varied by movement of the anchored end of the pretensioned main spring.

Still another object of this invention resides in the provision of novel clamping means whereby the mass is normally rigidly clamped.

This invention further contemplates means for critically damping the mass to cause it to come to rest at once so that as short an interval of time as possible will be consumed in making a reading at a location.

Still another object of this invention resides in the provision of novel means whereby the displacement of the mass can be observed.

Another object of this invention resides in the provision of means whereby the force required to change the lever arm through which the main pretensioned spring is acting to effect nulling of the instrument can be measured directly.

Other objects and advantages of the present invention will become apparent from the following detailed description when considered with the drawings in which:

Figure 6 is a side elevation of a gravity meter similar to that shown in Figure 1, showing a modified form of null system;

Figure 1:
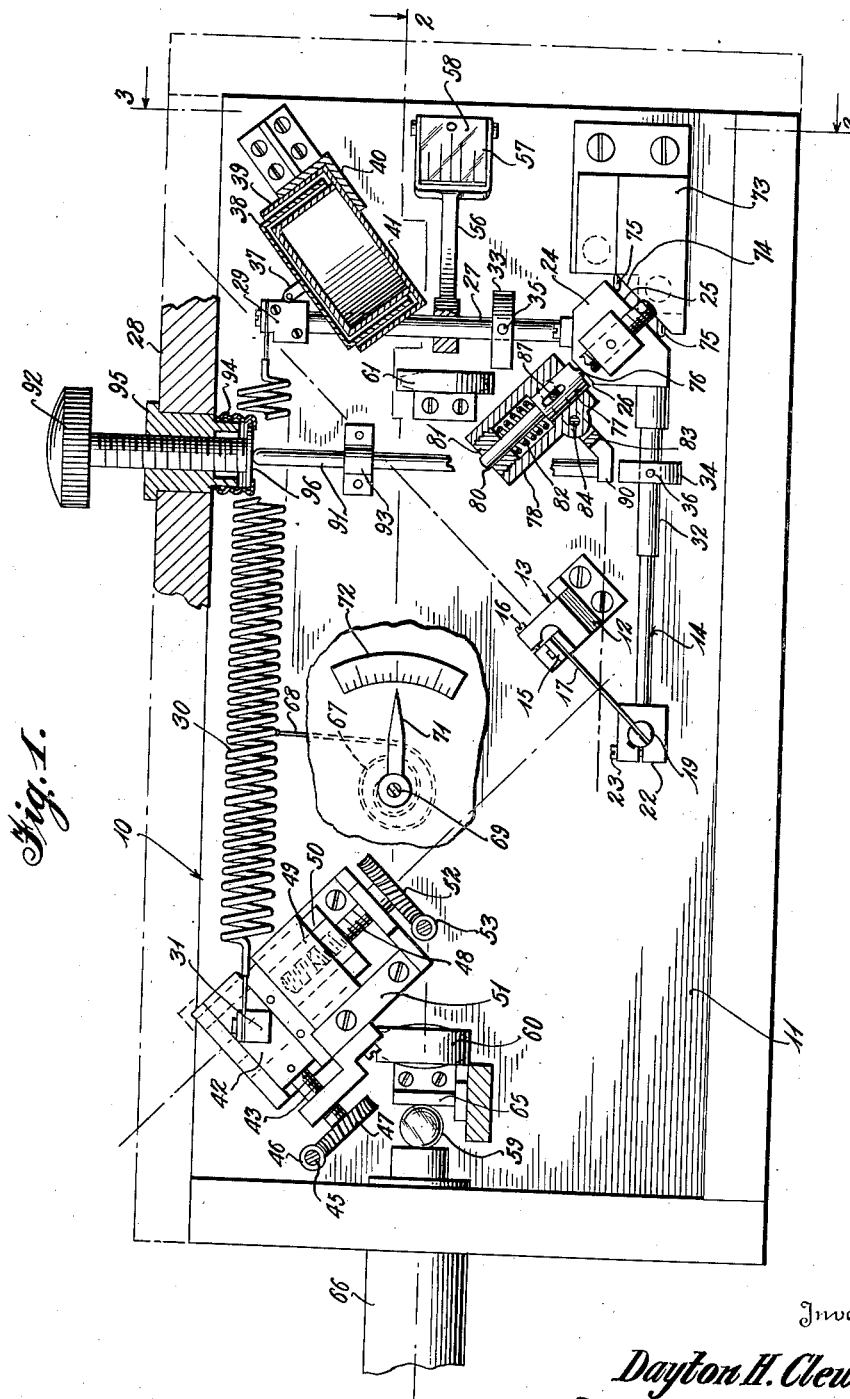
Figure 1 is a side elevation of the instrument shown partly in cross-section disclosing the various elements in operative relationship.
Figure 2:
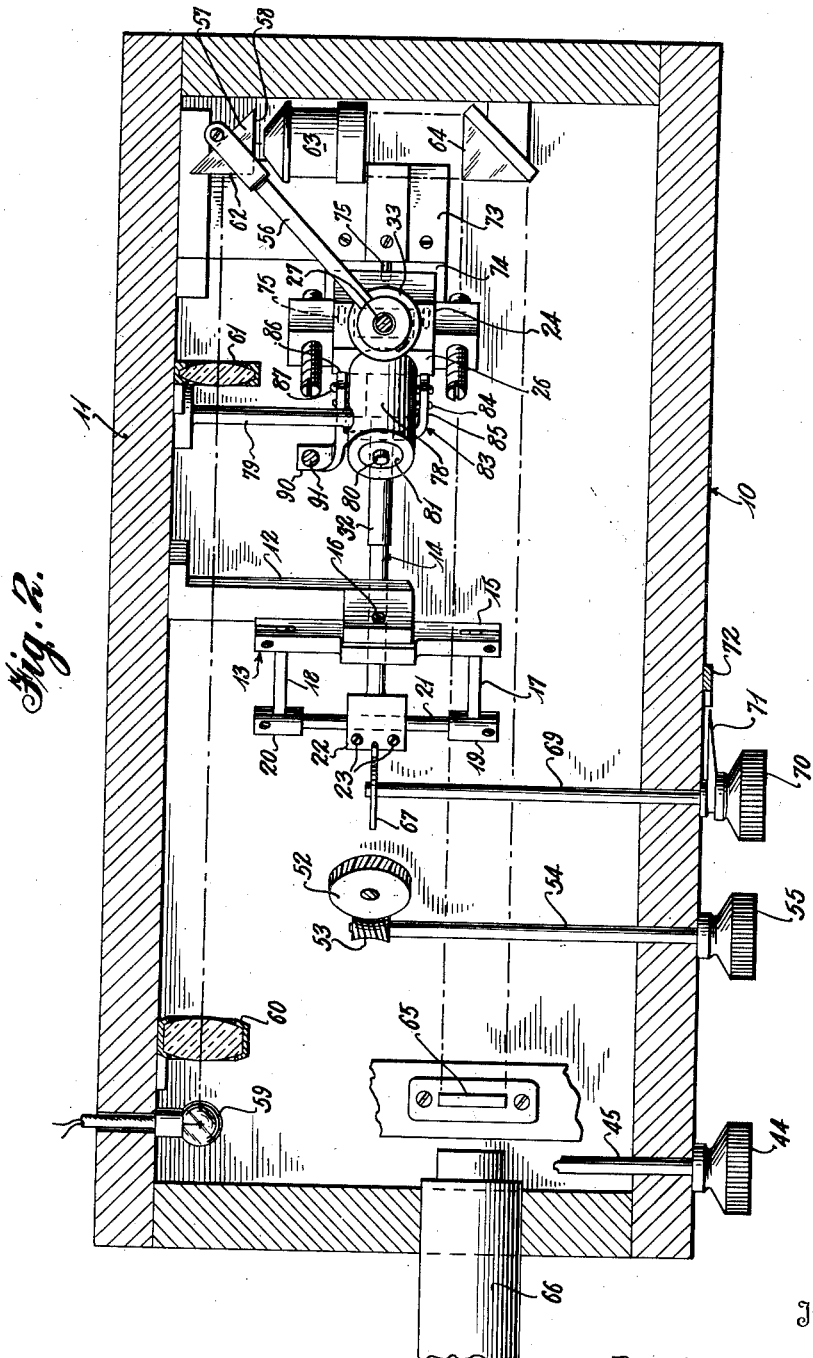
Figure 2 is a plan view of the apparatus taken along the line 2—2 of Figure 1, showing some of the elements in section.
Figure 3:
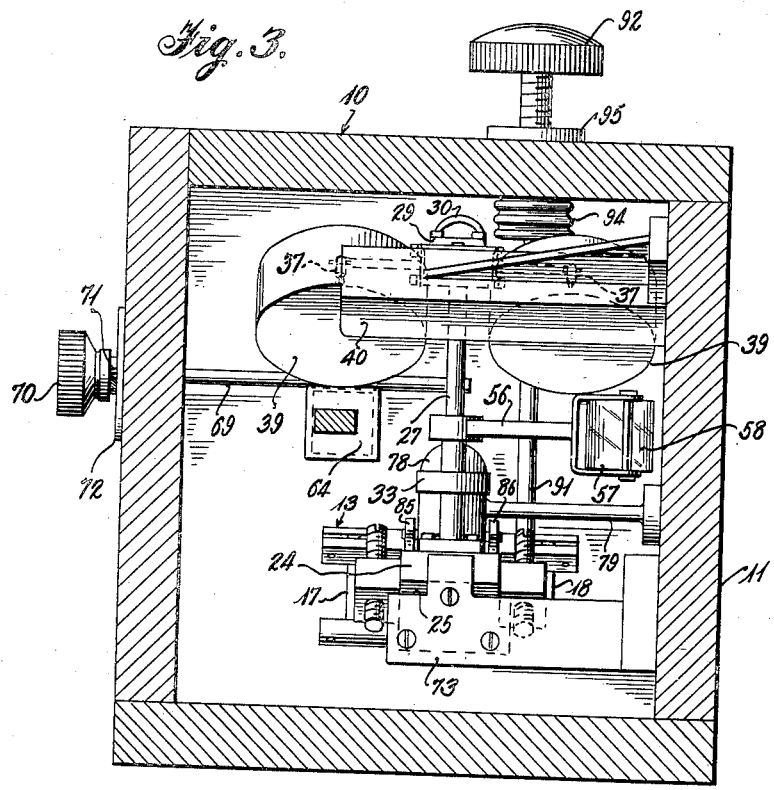
Figure 3 is an end elevation of the device taken along the line 3—3 of Figure 1, showing the apparatus within the case.

Figure 7 is a side elevation of a similar type of gravity meter differing from Figures 1 and 6 in that a system of levers are used to displace the main pretensioned spring to effect nulling of the system; and Figure 8 is a fragmentary sectional view taken along the line 8—8 of Figure 7, showing the system of levers by means of which the body of the main pretensioned spring is moved to effect a change in the lever arm through which it acts upon the pivoted mass.

Figure 4:
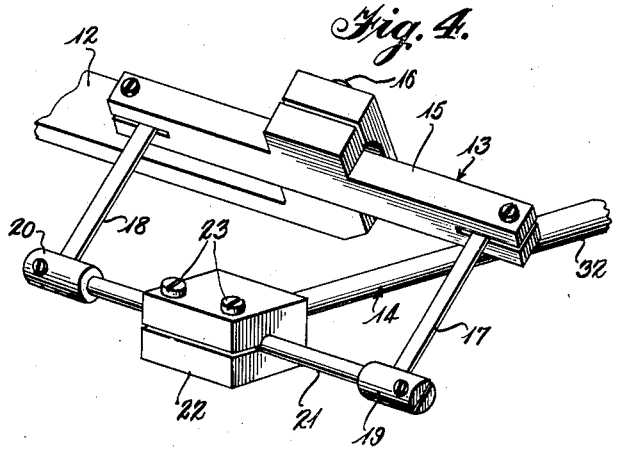
Figure 4 is a perspective view of the novel pivot means for the mass.
Figure 5:
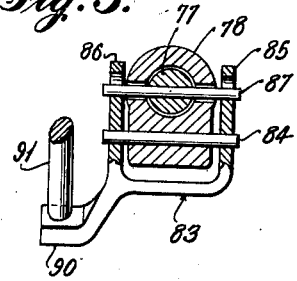
Figure 5 is a detailed sectional view of the mass clamp actuating means.

Referring to the drawings in detail, particularly Figure 1, there is shown a case 10 having disposed therein and secured to the side 11, a support 12, pivot means 13 for a mass 14. The pivot means 13 comprises a bar 15 which may be a flat leaf spring (Fig. 4) that is secured to the support 12 by means of suitable screws or bolts 16. The ends of the bar 15 carry clamps to receive ends of delicate leaf springs 17 and 18. Springs 17 and 18 are disposed parallel to each other and have their lower ends secured by means of clutches 19 and 20 respectively, to a rod 21 that is rigidly secured to the mass 14. Rod 21 is held in fixed relationship with mass 14 by means of the clutch 22 and its accompanying screws or bolts 23. Springs 17 and 18 are made of very thin resilient material and serve only as means through which the mass 14 can pivot. The mass 14 is substantially L-shaped and extends from the enlarged clutch portion 22 to an enlarged portion 24 which forms its angle. The enlarged portion 24 is provided with surfaces 25 and 26 that are adapted to act as bearing surfaces for clamping means. An upright portion 27 of reduced cross section extends from the enlarged portion 24 of the mass to a point near the top 28 of the casing 10. Anchoring means 29 are secured to and are adapted to be carried by this upper end of the mass by means of which a pretensioned horizontally disposed coil spring 30 can be secured at one end thereto. The other end of the coil spring 30 is secured to an anchor 31 which is provided with novel adjusting means to be described in detail later in the specification.

The mass 14 on each of its arms 27 and 32 is provided with minor masses 33 and 34 each of which is adapted to be adjusted along its respective arm to change the center of gravity of the mass. These minor masses are held in adjusted position on arms 27 and 32 by means of set screws 35 and 36 respectively. These masses, however, when properly adjusted in the laboratory, seldom require further adjustment.

The arms 27 and 32 of the mass 14 and the pretensioned coil spring 30 lie in the same vertical plane and the mass is adapted to move only in the vertical plane about an effective axis which would be a line passing transversely through the centers of springs 17 and 18. The upper end of the arm 27 of the mass has secured thereto a T-shaped member 37. Secured to the oppositely disposed arms of the T-shaped member are cups 38 each of which is adapted to rest within a second pair of cups 39 to produce a dash pot. These cups are fixed to a support 40 carried by the side 11 of the casing 10. The cups 39 are provided with inner sealed drum shape members 41 that are concentrically disposed in spaced relationship with the cups 38. The drums 41, the cups 38 and the cups 39 are so spaced concentrically that very small annular air passageways are formed. The elements of this novel damping means are so arranged that under normal operation of the instrument, the cups 38 and 39 will never contact each other, but will develop on oscillation of the mass, movement of air through the annular passageways that will immediately bring the mass to rest because of viscous resistance of the air to flow through said passageways.

The tension on the main pretensioned spring can be adjusted by the novel adjusting means provided at the end of the spring opposite the mass. There is provided at this end of the spring dual adjusting means that are adapted to move the anchor 31 for the spring 30 in any desired direction. The anchor 31 being secured to and adapted to move with element 42 will on movement of the screw 43 effect a displacement of the anchor in a plane at substantially a 45° angle to the axis of the spring. Movement of screw 43 is effected from a point outside of the casing 10 by means of the manipulating knob 44, rod 45, worm 46 and worm gear 47. Movement of the anchor along a line that is at right angles to that movement effected by screw 43 can be effected by the screw 48 which engages the sliding member 49. The sliding member 49 is slidably retained within a collar 50 which is secured to or made integral with a support 51. Support 51 is common for both of the adjusting means for the anchor 31. The screw 48 is manipulated to effect a movement of the anchor 31 through means of the worm gear 52, the worm 53, the rod 54 and the knob 55 from a point without the casing 10. Since the sliding member 50 is adapted to move in a line at right angles to the direction of movement of element 42 it is obvious that the anchor 31 for the pretensioned spring 30 can be moved in any desired direction to effect a change in the sensitivity of the instrument or to calibrate the instrument. In some cases, if desired, these two adjusting means can be operated together to effect nulling of the instrument. It can readily be seen that by changing the position of the anchor 31 for the pretensioned spring 30 and the position of the small masses 33 and 34 on the arms 27 and 32 respectively of the mass, a wide range of adjustment is afforded this instrument. For a particular area that it is desired to survey by means of the gravitational method adjustments of the device to the desired range are normally made by means of the knob 45. These adjustments when made, move the anchor of the spring 30 in such a manner that the mass is brought within the operating range. In order to ascertain when the mass is within the operating range of the device, that is, the range throughout which the instrument can be nulled, an arm 56, that is secured at one of its ends to the arm 27 of the mass, is provided at its outer end with a prism 57 having lines representing a scale 58 etched thereon. This prism and the arm 56 is adapted to move with the mass when displaced.

Therefore, if a source of light from a lamp 59 is projected through a lens 60, then through a second lens 61 onto the face 62 of the prism 57, this light will be reflected at right angles by the prism through a telescope 63 onto a second prism 64. This light striking a second prism 64 will be reflected back through a transparent scale 65 to the telescope 66. By means of the telescope 66, the scale 65 and the scale 58 carried by the prism 57, it is possible for the observer to tell when the mass is at its zero position. The zero position is the adjusted position for the instrument at its base station. In conducting gravitational surveys the mass through means of the indicator or pointer comprising the arm 56, the prism 57 and its scale 58, is brought to approximately zero position and then further adjustment is made to the position of the mass by vernier means to bring the scale reading to exactly zero. This vernier adjustment is made by changing the effective lever arm through which the pretensioned spring 30 acts upon the mass. To accomplish this a light spring 67 similar to that used in conjunction with the balance wheel of a watch is secured at its outer end 68 to the spring 30 at a point intermediate the ends thereof. The inner end of the light spiral spring 67 is secured to an axle formed by a rod 69 in such a manner that rotation of the rod will apply or remove tension from this spring. Variation of the tension in the spring 67 will effect a displacement of the body of the spring 30 to effect a change in the effective lever arm through which spring 30 acts upon the mass. The tension in spring 67 is varied by rotating the rod 69 by means of knob 70. The amount of rotation imparted to the rod 69 to effect a change of tension in the spring 67 is indicated by means of the pointer 71 carried by the inner end of rod 69, and the scale 72 over which the pointer 71 rides.

Due to the delicacy of instruments of this kind it is necessary that means be provided whereby the mass can be rigidly clamped while the instrument is being subjected to jars or movements of any character which would change the physical characteristics of the sensitive elements. To this end there is provided a support 73 which is secured to the side 11 of the casing 10. Support 73 is so formed that it presents a face 74 to the mass that is parallel to the face 25 of the enlarged portion of the mass. Extending substantially horizontally from the face 74 of the support, are three fingers 75 which are adapted to make point contact with the face 25 of the enlarged portion of the mass when the mass is clamped in inoperative position. Faces 25 and 26 of the enlarged portion of the mass are made parallel. Face 26 is adapted to be contacted by a point 76 carried by a plunger 77 to clamp the mass against the fingers 75. Plunger 77 is slidably held within a cylindrical casing 78. Casing 78 is made integral with or secured to an arm 79 that extends to side 11 of the casing 10 where it is fastened by suitable screws or bolts. Plunger 77 is provided with a stem 80 that extends upwardly through the cylinder 78 to a point outside the cylinder. A guide plug 81 threadedly engages the inside and forms a closure for the upper end of cylinder 78. This plug 81 is centrally bored to provide a passageway for the stem 80 of the plug 77. Disposed within the cylinder, concentrically with the stem 80 between the plug 81 and the plunger 77 by bearing against their inner faces, is a coil spring 82 which normally tends to force the plunger 77 to its outermost position. Movement of the plunger 77, however, is limited and controlled by a yoke 83 that is pivotally secured to a projecting shoulder on the under surface of the cylinder 78 near its lower end by means of a pin 84. The two arms 85 and 86 of yoke 83 extend to diametrically opposite sides of the lower end of cylinder 78. The ends of the arms of the yoke are provided with openings adapted to receive pin 87 carried by the plunger 77. The pin 87 extends from the plunger through elongated openings in the cylinder 78 to points outside of the cylinder and extend through the openings in the arms of the yoke. Therefore, movement of the end 90 of the yoke will effect a pivoting of the yoke about the pin 84 as an axis to cause a reciprocation of the plunger 77 within the cylinder 78. Movement of the end 90 of the yoke is effected by means of a rod 91 and the adjusting screw 92. Rod 91 is journaled in a bearing 93 in such a manner that vertical movement is permitted. A metal bellows 94 having its upper end secured to a bushing through which the adjusting screw 92 extends is provided with a sealing disc 96 to effect a fluid-tight seal between the outside and inside of the instrument case.

To clamp the mass in inoperative position, screw 92 is backed up to remove pressure from the end 90 of the yoke 83. The spring 82 causes the plunger 77 to move downwardly and out of the cylindrical housing 78 until the point 76 contacts the face 26 of the mass and forces the face 25 of the mass firmly against the fingers 75. The mass is held in this clamped position when there is likelihood that the instrument as a whole will be moved or disturbed in such a manner that there is a likelihood of changing the physical constants of the delicate elements comprising the working parts of the instrument. When the instrument has been properly set up and leveled at a station where it is desired to measure the force of gravity or any variation in the force of gravity at that point, as compared to another point, the screw 92 is screwed down to apply pressure through the rod 91 on the end 90 of the yoke 83 to cause the plunger 77 to be moved back from the mass into the cylindrical case 78, a distance sufficiently far that the mass will swing free of the point 76 and the fingers 75.

In Figure 6 there is shown a modification of the null system disclosed in Figure 1, differing therefrom in that a light coil spring 97 is used to displace the main pretensioned spring 30 instead of the spiral type of spring 67 shown in Figure 1. The lower end of the light coil spring 97 is secured to the body portion of the main pretensioned spring intermediate the ends thereof, while the upper end of spring 97 is axially secured to an adjusting screw 98, which on rotation will increase or decrease the tension in spring 97 to displace the body of the main pretensioned spring 30. This effects a change in the effective lever arm through which the main spring acts upon the mass 14. Adjusting screw 98 carries fixed thereto an indicator 99 that is adapted to cooperate with a scale 100 to give a reading of the amount of effort exerted in displacing the body of the main pretensioned spring 30. The scale 100 can be calibrated in terms of gravitational force and readings made of the variations of gravitational force from point to point by noting the amount of effort exerted on spring 97 or the movement of the screw 98 necessary to displace the body portion of the main spring 30, an amount sufficient to null the system or return the mass to its zero or base station reading.

This null system like that discussed in connection with Figure 1 has an inherent advantage over other null systems in that nulling is accomplished without appreciably changing the sensitivity of the instrument. Although there is shown an indicator 101 carried by the arm 27 of the mass which is adapted to cooperate with a scale 102 to indicate the disposition of the mass, this is merely for the purpose of illustration and it is obvious to those skilled in the art that an optical system similar to that shown in Figure 1 could be used without departing from the spirit of the invention.

In Figure 7 there is shown still another modification of the null system. In this form of the invention, as well as in the other two described above, nulling is accomplished by displacing the body portion of the pretensioned spring 30 to change the effective lever arm through which it acts upon the mass. In the system disclosed in Figures 7 and 8, a plurality of levers with connecting linkage are used.

Referring to Figure 8, a support 103, a fragment of which is shown, is appropriately secured to an inside wall of the casing 10. Lever 104 by means of a light leaf spring 105 is pivotally secured at one end to the support 103 by means of a screw 106. Lever 104 has its end 107 which is adjacent the pivot, bent to form an arcuate seat 108 that is adapted to receive transversely the body of the main pretensioned spring 30.

The arcuate seat 108 is formed in lever 104 very near its pivot point so that a relatively large movement of end 109 of lever 104 will effect only a very small movement of the body of spring 30. Due to the fact that it is only necessary to move spring 30 a very small fraction of an inch to effect a nulling of the instrument, the magnification of this movement must be very great. In order to further magnify the movement of spring 30, end 109 of lever 104 is connected by means of a link 110 to a second lever 111. Lever 111 is provided with a pivot 112 very near the point where it is secured to link 110, thereby forming a very short lever arm 113 on the link side of the pivot. The distance from the pivot to end 114 of the lever is made as great as possible in order to obtain the necessary magnification of the displacement of the main spring 30. End 114 of lever 111 is biased upwardly into contact with an adjusting screw 115 by means of a light spring 116. The lower end of spring 116 is secured directly to lever 111 and the upper end of the spring is anchored to the inner surface of the casing 10. Adjusting screw 115 is provided with an indicator or pointer 117 that is adapted to cooperate with a scale 118 to indicate the amount of rotation of the screw necessary to displace the lever system and consequently the body portion of the spring 30 to null the system. As described in connection with the system illustrated in Figure 6, it is obvious that scale 118 could be calibrated in terms of gravitational force and in conducting the survey of an area by measuring the variations in gravitational force from point to point over the area, the readings made directly from scale 118 can be plotted to give a contour map which would simulate the elevation or existent conditions of the substrata.

Many other detailed features that may be added as refinement to the gravity meter illustrated will immediately become apparent to those skilled in the art, and it is to be understood that the scope of this invention includes the principles of this invention regardless of whether or not these numerous additional features are incorporated.

I claim:

1. In a gravity meter having a mass pivoted for rotation in a vertical plane, a pretensioned spring for elastically balancing the weight of the mass, an indicator carried by the mass, fixed means adapted to cooperate with the indicator for measuring the displacement of the mass, a helical spring secured to the pretensioned spring at a point intermediate the ends thereof, a support, and means for adjustably securing the free end of the helical spring to the support whereby a change of tension in the helical spring will laterally displace the body of the pretensioned spring to effect a change in the lever arm through which the pretensioned spring acts upon the mass to displace the mass an amount sufficient to null the instrument.

2. In a gravity meter having a mass pivoted for rotation in a vertical plane, a pretensioned spring for elastically balancing the weight of the mass, an indicator carried by the mass, fixed means adapted to cooperate with the indicator for measuring the displacement of the mass, a coil spring secured to the pretensioned spring at a point intermediate the ends thereof, a support, and means for adjustably securing the free end of the coil spring to the support whereby a change of tension in the coil spring will laterally displace the body of the pretensioned spring to effect a change in the lever arm through which the pretensioned spring acts upon the mass to displace the mass an amount sufficient to null the instrument.

3. In a gravity meter having a mass pivoted for rotation in a vertical plane, a pretensioned spring for elastically balancing the weight of the mass, an indicator carried by the mass, fixed means adapted to cooperate with the indicator for measuring the displacement of the mass, elastic means secured to the pretensioned spring at a point intermediate the ends thereof and extending at substantially right angles to the pretensioned spring, a support, and means for adjustably securing the free end of the elastic means to the support whereby a change of tension in the elastic means will laterally displace the body of the pretensioned spring to effect a change in the lever arm through which the pretensioned spring acts upon the mass to displace the mass an amount sufficient to null the instrument.

4. In a gravity meter of the type used in conducting geophysical surveys having a support, a mass, means for pivotally mounting the mass on the support, elastic means for supporting the mass against the action of gravitational forces, means for indicating the disposition of the mass relative to a part of the support and means for nulling the system to measure the variation in gravitational force from point to point over the earth's surface, said nulling means comprising elastic means for exerting a minor effort in a direction transversely of the axis of the first elastic means to transversely displace the first elastic means to effect a variation in the lever arm through which the first elastic means acts upon the mass, whereby the mass is caused to move in a vertical plane about its pivot to a predetermined position, and means for indicating the amount of minor effort exerted on the first elastic means to null the system.

5. In a gravity meter of the type used in conducting geophysical surveys having a support, a mass, means for pivotally mounting the mass on the support, elastic means for supporting the mass against the action of gravitational forces, means for indicating the disposition of the mass relative to a part of the support and means for nulling the system to measure the variation in gravitational force from point to point over the earth's surface, said nulling means comprising means for exerting a minor effort in a direction transversely of the axis of the elastic means to transversely displace the elastic means to effect a variation in the lever arm through which the elastic means acts upon the mass, whereby the mass is caused to move in a vertical plane about its pivot to a predetermined position, and means for indicating the amount of minor effort exerted on the elastic means to null the system.

DAYTON H. CLEWELL.